US006901673B1

(12) United States Patent
Cobb et al.

(10) Patent No.: US 6,901,673 B1
(45) Date of Patent: Jun. 7, 2005

(54) TIE-IN DEVICE FOR THE CORRELATION OF COORDINATE SYSTEMS

(75) Inventors: James M. Cobb, Burien, WA (US); James A. DeLand, Bothell, WA (US); Timothy G. Nielsen, Kent, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/850,165

(22) Filed: May 20, 2004

(51) Int. Cl.$^7$ ............................. G01B 11/26; G01B 9/02
(52) U.S. Cl. ............................. 33/502; 33/227; 33/293; 702/95
(58) Field of Search ........................ 33/227, 293, 294, 33/502, 613, 645; 702/85, 94, 95; 73/1.79

(56) References Cited

U.S. PATENT DOCUMENTS

| | | | | |
|---|---|---|---|---|
| 6,023,850 A | * | 2/2000 | Trapet ......................... | 33/502 |
| 6,493,956 B1 | * | 12/2002 | Matsuda ...................... | 33/502 |
| 6,598,306 B2 | * | 7/2003 | Eaton .......................... | 33/502 |
| 6,772,619 B2 | * | 8/2004 | Nashiki et al. .............. | 73/1.79 |
| 6,792,370 B2 | * | 9/2004 | Satoh et al. .................. | 702/95 |
| 2004/0244464 A1 | * | 12/2004 | Hajdukiewicz et al. ...... | 73/1.79 |

FOREIGN PATENT DOCUMENTS

| | | |
|---|---|---|
| JP | 57004564 | 1/1982 |
| WO | WO 00/57133 | 9/2000 |

OTHER PUBLICATIONS

Constellation $^{3d-I}$ Brochure; White Paper 071502—Indoor GPS Technology for Metrology; available for download at http://www.constellation3di.com/system/white.php; article copyright 2001.
Leica Laser Tracker System—Portable Coordinate Measuring Machine for small and large objects; Measuring Principle of the 3D Laser Tracker LTD500 (p. 9); available at http://www.a-solution.com.au/ads/pages/download/ LTD500 Brochure EN.pdf; article copyright 1999.
Leica Geosystems—Laser Radar System—Leica LR200; available at http://www.leica-geosystems.com/ims/product/ lr200.htm; no date on article.

* cited by examiner

Primary Examiner—G. Bradley Bennett
(74) Attorney, Agent, or Firm—Alston & Bird LLP

(57) ABSTRACT

There is provided a tie-in device for correlating at least two different coordinate systems. The tie-in device comprises an outer surface having a predefined geometric shape, such as a generally spherical surface, located at a first predefined distance from a reference point of the tie-in device, such as the center of the generally spherical surface. The outer surface of the tie-in device is mappable to determine the location of the reference point in a first coordinate system. The tie-in device comprises at least one target located at a second predefined distance from the reference point. The target is locatable in a second coordinate system to determine a location of the reference point in a second coordinate system. The relative locations of the reference point are tied-in, advantageously by processing circuitry, to correlate the first and second coordinate systems.

30 Claims, 3 Drawing Sheets

TIE-IN DEVICE FOR THE CORRELATION OF COORDINATE SYSTEMS

BACKGROUND OF THE INVENTION

1. Field of the Invention

The present invention is related to positioning systems, and more particularly, to tie-in devices for the correlation of two or more coordinate systems to facilitate positioning of a component.

2. Description of Related Art

Assembly of large structures, such as aircraft, requires the use of large-scale measurement systems to ensure proper assembly of the structures. Components of these large structures are typically assembled using large steel holding fixtures that are by necessity rigid and fixed to the factory floor. The fixtures support the components and provide limited movement capability to slide the components together for assembly. The fixtures require periodic measurement, or surveying, to ensure that the fixture is in proper alignment for the specialized assembly procedure. The fixtures typically do not allow for flexibility in the assembly process. For example, each fixture typically requires a specific design for the component and assembly procedure it facilitates. Accordingly, changes to the component or assembly procedure can be expensive. Furthermore, factory floor space is occupied by fixtures that are not suited for other activities.

Therefore, it is desirable to provide adaptable fixtures that can be used for various components and assembly procedures. One consideration in the design of fixtures is the positioning of various components relative to one another during the assembly procedure. The components must be accurately aligned and positioned during assembly in order for the assembled structure to have the proper structural properties and optimal performance characteristics.

Presently, many existing measurement technologies are used independently during the assembly of such components to ensure proper or optimal assembly. Measurements are typically made relative to predetermined points on the fixtures, and those measurements are used to determine the position or alignment of the component supported by the fixture. These determinations are based on various assumptions, such as assumptions regarding the position of the component relative to the fixture; therefore, the accuracy of such determinations is limited. In addition, these measurements are taken well in advance of the actual assembly, thus these measurement techniques may not provide real-time information during assembly to ensure proper and/or optimal assembly of the components.

Present measurement systems, also called locating devices, also do not provide techniques to accurately correlate the measurement data taken with multiple measurement systems in real-time. These measurement systems take measurements in independent coordinate systems. Measurement systems may transfer measurement data amongst the various systems, but the process is typically done by file transfer and can be very time consuming, considering the feedback and control systems for large component positioning systems require nearly instantaneous measurements for adequate performance.

Therefore, a need for correlating two or more coordinate systems of independent measurement systems exists. This ability to correlate at least two different coordinate systems would allow multiple measurement systems to provide measurement data in real-time during the assembly of large components to ensure proper and/or optimal assembly of the components.

BRIEF SUMMARY OF THE INVENTION

Tie-in devices are provided according to the present invention for correlating at least two coordinate systems. Each coordinate system is defined by an independent measurement system, and the tie-in devices allow for correlation of the measurements of each of these measurement systems. This correlation of measurement data provides for precise assembly of large components when multiple measurement systems are used to monitor and control the assembly.

According to the present invention, the tie-in device comprises an outer surface having a predefined geometric shape located at a first predefined distance from a reference point of the tie-in device. Advantageously, the outer surface comprises a generally spherical surface, wherein the center of the generally spherical surface defines the reference point. The outer surface of the tie-in device is mappable to determine a location of the reference point in a first coordinate system. The tie-in device also comprises at least one target located at a second predefined distance from the reference point. The target is locatable in a second coordinate system to determine a location of the reference point in the second coordinate system. The relative locations of the reference point are tied-in to correlate the first and second coordinate systems. Accordingly, measurements made in the first coordinate system can be tied-in to measurements made in the second coordinate system.

Positioning systems for moving a component to a predefined position are also provided according to the present invention. The positioning system comprises a tie-in device, such as a tie-in device described above, and comprises a first locating device that maps the outer surface of the tie-in device. By mapping a surface of the component, along with the outer surface of the tie-in device, the first locating device determines the position of the component relative to the reference point of the tie-in device. Advantageously, the first locating device comprises a laser radar measurement device. The positioning system also comprises a second locating device that transmits a signal that is in communication with the target to locate the target and determine a location of the reference point in a second coordinate system. Advantageously, the second locating device comprises an infrared measurement device or a laser interferometer measurement device, and the target comprises an infrared detector or a laser interferometer reflector, respectively. The relative locations of the reference point determined by the first and second locating devices are tied-in to correlate the first and second coordinate systems and thereby define the position of the component in the second coordinate system. The positioning system also comprises an actuating device that moves the component to the predefined position based upon the position of the component in the second coordinate system. Advantageously, the actuating device comprises at least one servomotor.

A method is also provided according to the present invention for defining a position of a component. A location of at least one reference point of a tie-in device is determined in a first coordinate system by transmitting a first signal that is in communication with an outer surface of the tie-in device having a predefined geometric shape located at a first predefined distance from the reference point. The first signal also maps a surface of the component in the first coordinate system to determine the position of the component relative to the reference point in the first coordinate system. A location of the reference point in a second coordinate system is also determined by transmitting a second signal that is in communication with at least one target located at a second predefined distance from the reference point to determine the location of the reference point in the second coordinate system. The first and second coordinate systems are correlated by tying-in the relative locations of the reference point to define the position of the component in the second coordinate system.

Therefore, embodiments of the present invention facilitate movement of a component using multiple locating devices to measure the position and alignment of the component. By correlating the coordinate systems of all the locating devices with the tie-in device, the component may be located and moved using multiple locating devices. Furthermore, embodiments of the present invention provide real-time measurement data during the assembly of large components to ensure proper and/or optimal assembly of the components.

BRIEF DESCRIPTION OF THE SEVERAL VIEWS OF THE DRAWINGS

Figure 1:
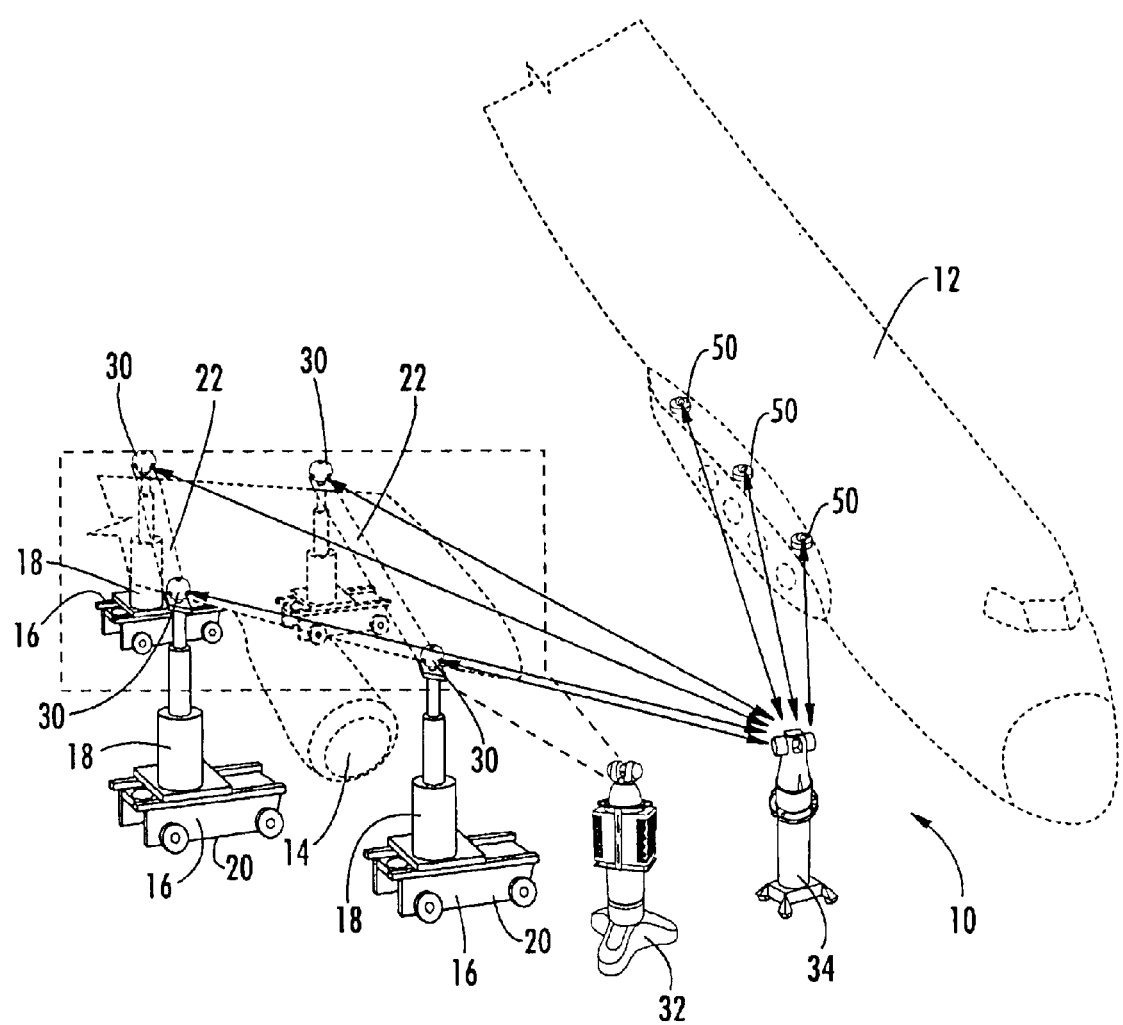
Figure 2:
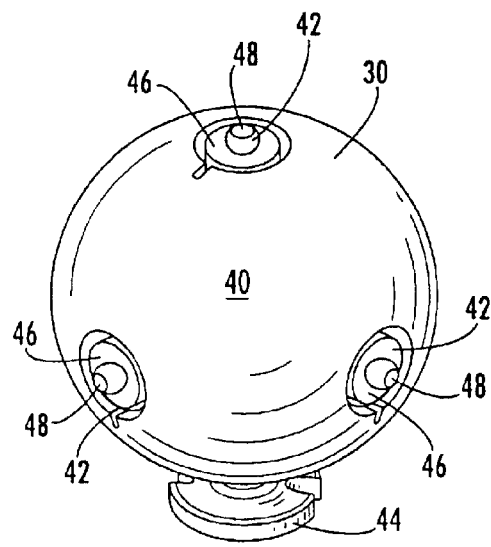
Figure 3:
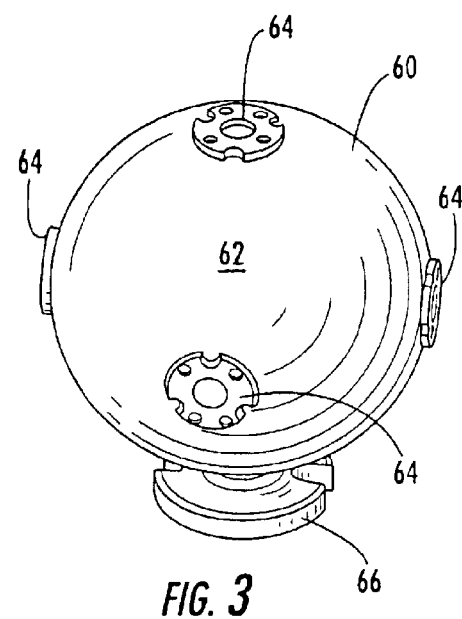
Figure 4:
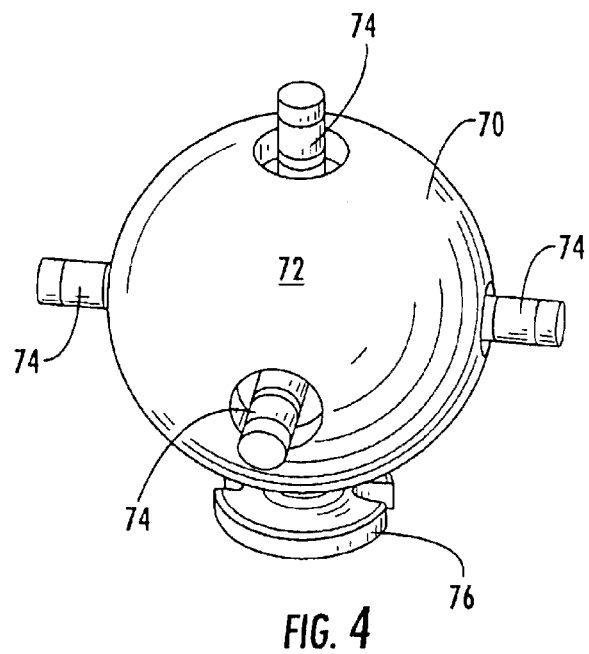
Figure 6:
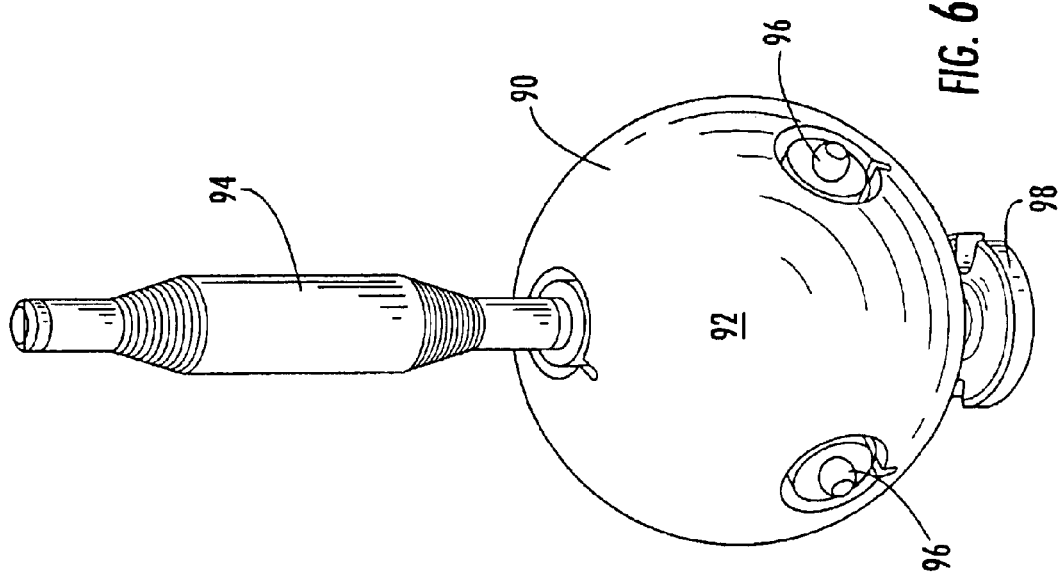
Figure 5:
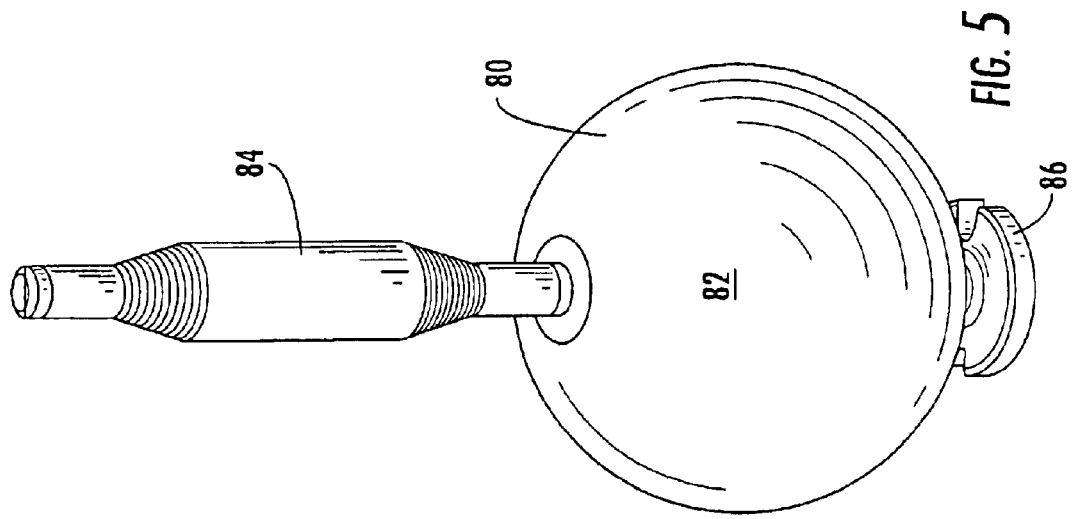

Having thus described the invention in general terms, reference will now be made to the accompanying drawings, which are not necessarily drawn to scale, and wherein:

FIG. 1 is an environmental view of four tie-in devices in accordance with one embodiment of the present invention used during the assembly of an aircraft wing to an aircraft fuselage;

FIG. 2 is a perspective view of the tie-in device of FIG. 1, illustrating a generally spherical outer surface with laser interferometer reflectors mounted thereto;

FIG. 3 is a perspective view of a tie-in device in accordance with a second embodiment of the present invention, illustrating a generally spherical outer surface with infrared flat detectors mounted thereto;

FIG. 4 is a perspective view of a tie-in device in accordance with a third embodiment of the present invention, illustrating a generally spherical outer surface with infrared cylindrical detectors mounted thereto;

FIG. 5 is a perspective view of a tie-in device in accordance with a fourth embodiment of the present invention, illustrating a generally spherical outer surface with an infrared vector bar detector mounted thereto; and FIG. 6 is a perspective view of a tie-in device in accordance with a fifth embodiment of the present invention, illustrating a generally spherical outer surface with an infrared vector bar detector and laser interferometer reflectors mounted thereto.

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

With reference to FIGS. 1–6, a positioning system 10 in accordance with various embodiment of the present invention are illustrated. The positioning system 10 of FIG. 1 is for the measurement and positioning of components during the assembly of a large structure, such as an aircraft. Further embodiments of the present invention may comprise alternative positioning systems structured and arranged for measuring, positioning, or performing other tasks for alternative applications. The is positioning systems of the present invention are advantageously used in applications involving large components or structures, such as the assembly of aircraft or other vehicles, a building, or the like; however, the positioning systems may also be used with relatively smaller components or structures.

Referring again to FIG. 1, the positioning system 10 is being used during the assembly of an aircraft, wherein the fuselage 12 is generally stationary such that the wing component 14 is advantageously moved to the fuselage during assembly. The fuselage 12 is supported by suitable stationary stands (not shown), and the wing component 14 is supported by moveable actuating devices 16. The embodiment of FIG. 1 comprises four actuating devices 16 positioned at various locations under the wing component 14 to support the wing component and move the wing component during assembly. Alternative embodiments of the positioning system comprise at least one actuating device and may comprise alternative actuating devices, particularly for the assembly of alterative structures. The actuating devices 16 each provide lateral motion that is generally in a forward and reverse direction and each provide vertical motion independent of one another. The actuating devices 16 of FIG. 1 each comprise a hydraulic cylinder 18 that provides the vertical motion to the wing component 14. Each actuating device 16 of FIG. 1 also comprises at least one servomotor to laterally move the entire actuating device and/or to laterally move the hydraulic cylinder 18 on the base 20 of the actuating device. Furthermore, the hydraulic cylinder 18 of the actuating device 16 may be actuated with an electromechanical pump so that the entire actuating device may be electronically controlled, advantageously by processing circuitry as described below. Further embodiments of the actuating device may comprise alternative motors, pumps, or the like to move the component supported by the actuating device. Therefore, the positioning system 10 of FIG. 1 is capable of moving the wing component 14 in an automated fashion based upon the measurement data provided by the positioning system during the assembly of the aircraft. The component being moved is advantageously moved to a predefined position relative to the other component(s) to which the moved component will be assembled.

Further embodiments of the present invention comprise alternative actuating devices. The actuating devices of further embodiments may support a component in alternative manners, may provide motion by alternative devices, may provide motion in alternative directions, may be controlled in alternative fashions, or may define additional characteristics with alternative properties. Advantageously, the actuating devices of further embodiments are adaptable for many different components for various assembly techniques so that they do not occupy an inordinate amount of factory floor space and are easily configured for use with different assemblies.

Referring again to FIG. 1, the actuating devices 16 of the positioning system 10 include two generally horizontal bars 22 between the actuating devices, wherein one bar is supported by one actuating device at each of the two ends of the bar. Therefore, the two actuating devices 16 that are closer to the fuselage 12 support a first generally horizontal bar 22, and the two actuating devices that are further from the fuselage support a second generally horizontal bar. The wing component 14 is supported by the two generally horizontal bars 22 during the assembly procedure. Advantageously, the actuating devices 16 move in a generally consistent manner so that the actuating devices maintain a generally constant relative arrangement so that the actuating devices do not move relative to the generally horizontal bars 22 and/or the wing component 14. The generally horizontal bars 22 advantageously comprise a protective surface, such as nylon, polymer, or the like to list a few non-limiting examples, so that the wing component 14 is not damaged during the assembly procedure. Further embodiments of the positioning system may comprise alternative bars or arrangements of bars for supporting the wing component 14. Still further embodiments of the positioning system may comprise alternative devices for supporting the wing component.

Tie-in devices 30 of one embodiment of the present invention are also illustrated in FIG. 1. The tie-in devices 30 of FIG. 1 are mounted on the top surface of the generally horizontal bars 22 on the portion of the bars extending beyond the wing component 14. The tie-in devices 30 may also be mounted at any position on the wing component 14, the horizontal bars 22, the actuating devices 16, and/or any other surface that defines a fixed position relative to the wing component and that is within the line of sight of the first locating device 32 and the second locating device 34. It is important that at least one tie-in device 30 remain within the line of sight of the first and second locating devices 32 and 34 because the tie-in device is used to check that the first and second coordinate systems of the first and second locating devices, respectively, remain correlated as described herein. Although the coordinate systems can be correlated with only one tie-in device, two tie-in devices are preferably used to correlate the coordinate systems, and more preferably three or more tie-in devices are used to correlate the coordinate systems. In some embodiments of the present invention, the accuracy of the positioning system is improved by providing three or more tie-in devices.

The tie-in device 30 of FIG. 1 is illustrated in more detail in FIG. 2. The tie-in device 30 comprises an outer surface 40 having a predefined geometric shape that is located at a first predefined distance from a reference point of the tie-in device. The outer surface 40 of the tie-in device 30 of FIG. 2 comprises a generally spherical surface, such that a center of the generally spherical surface defines the reference point. The tie-in device 30 of FIG. 2 defines a six inch diameter, such that the first predefined distance is approximately three inches; however, further embodiments of the tie-in device may define smaller or larger diameters and alternative first predefined distances. The diameter of the spherical tie-in device, or alternatively shaped tie-in device, is advantageously dimensioned according to the accuracy and/or resolution of the locating device that maps the outer surface of the tie-in device.

The outer surface 40 of the tie-in device 30 is mappable by the first locating device 32 of FIG. 1 to determine a location of the reference point in the first coordinate system. By mapping the outer surface 40 of the tie-in device 30, the first locating device 32, which advantageously comprises a laser radar measurement device as described more fully below, determines the curvature of the generally spherical surface and is therefore able to determine the center of the generally spherical surface, which is the reference point of the tie-in device 30. Further embodiments of the present invention may define outer surfaces of the tie-in device with alternative predefined geometric shapes, such as elliptical, polygonal, or the like to list non-limiting examples, such that a reference point, such as a center, intersection of surfaces, or the like to list non-limiting examples, can be determined by a first locating device. Moreover, further embodiments of the present invention may define alternative first locating devices to map the outer surface of the tie-in device, such as radar, sonar, infrared imaging, or the like to list non-limiting examples.

The outer surface 40 of the tie-in device 30 does not necessarily comprise a generally spherical surface about the entire outer surface, as shown in FIG. 2. The outer surface 40 of the tie-in device 30 does, however, define at least one recess to receive at least one target 42 on the tie-in device 30. The recess of the outer surface 40 is advantageously small enough that the predefined geometric shape is sufficiently mappable by the first locating device 32 to determine the location of the reference point. The target 42 is joined to the recess of the outer surface 40 of tie-in device 30 by fasteners, adhesives, or the like such that the target is located a second predefined distance from the reference point. Advantageously, if the tie-in device 30 comprises more than one target 42, the second predefined distance between each target and the reference point is equivalent. Alternatively, the targets 42 are positioned on the outer surface of the tie-in device such that the reference point is locatable based upon the relative positions of the tie-in devices. The second predefined distance is advantageously defined in a direction that is perpendicular to the target, wherein the second locating device is not only able to determine the location of the target but is also able to determine the orientation of the target. For the target 42 of FIG. 2, the second predefined distance is approximately three inches in a radial direction toward the center of the generally spherical outer surface 40, if the center of the reflector is proximately located at the same radius as the outer surface.

The at least one target 42 of the tie-in device 30 of FIG. 2 comprises a flat surface 46 that is generally tangential to the generally spherical surface 40 of the tie-in device and comprises a reflector 48 with an opening that is also generally tangential to the generally spherical surface of the tie-in device, such that the central axis of the opening is generally radial. Therefore, the second locating device 34 of FIG. 1 is able to determine the location of the target, such as the center of the reflector, and is able to determine the orientation of the reflector to determine the direction of the second predefined distance and thus determine the location of the reference point. Alternatively, the second locating device is able to determine the location of at least two targets to further determine the location of the reference point relative to the location of the at least two targets.

The target 42 of the tie-in device 30 is locatable by the second locating device 34 of FIG. 1, such that the second locating device is in communication with the target to determine a location of the reference point in the second coordinate system. The second coordinate system is different than the first coordinate system, and the first and second coordinate systems are correlated by tying-in the relative locations of the reference point, as described more fully below. By locating the at least one target 42, the second locating device 34, which advantageously comprises a laser interferometer measurement device in FIG. 1 and is described more fully below, determines the location of the at least one target and is therefore able to determine the location of the reference point of the tie-in device 30 by combining the location of the at least one target with the second predefined distance from the reference point. Advantageously, two, three, or more targets are advantageously located on a single tie-in device to determine the location of the reference point of the tie-in device.

The tie-in device 30 of FIG. 2 defines five targets 42 that are generally located along the axes of the generally spherical outer surface 40. Advantageously, four targets 42 are centered in the midplane of the generally spherical outer surface 40, typically being equally angularly spaced about the midplane, wherein each of the four targets are oriented generally orthogonal to those targets on either side, and wherein the targets generally face radially outward from the generally spherical outer surface. A fifth target 42 is defined on the top of the generally spherical outer surface 40 and a base 44 is defined on the bottom of the generally spherical outer surface. The base 44 is provided so that the tie-in device 30 may be mounted to the actuating device, the component, or any other surface such that the tie-in device maintains a constant location relative to the component being moved during the assembly. The base 44 is advantageously mounted with fasteners; however, the base may also be mounted with alternative devices, such as adhesives, magnets, toggle clamps, or the like to list a few non-limiting examples.

Referring again to the targets 42 of FIG. 2, the orientation of the targets 42 about the outer surface 40 advantageously ensures that at least one target will be in the line of sight of the second locating device 34 if the second locating device is in the line of sight of the tie-in device 30. The at least one target 42 of FIG. 2 is a laser interferometer reflector 48. Further embodiments of the present invention may define alternative targets of the tie-in device, as described for FIGS. 3–6 below. Moreover, further embodiments of the present invention may define alternative second locating devices as also described below.

The tie-in device 30 of FIG. 2 allows the coordinate systems of the two or more locating devices to be correlated so that known positions of components located by a first locating device in a first coordinate system may be defined relative to other components or devices located by a second locating device in a second coordinate system, or vice versa. The two or more locating devices 32 and 34 produce a data signal that is advantageously processed by processing circuitry, such as one or more microprocessors or other computing devices. By processing the data from the first locating device 32 of FIG. 1, the location of the reference point is determined in the first coordinate system based upon the mapped outer surface 40 of the tie-in device 30. By processing the data from the second locating device 34 of FIG. 1, the location of the reference point is determined in the second coordinate system based upon the location of the at least one target and the second predefined distance between a target and the reference point. The processing circuitry is thus able to correlate the first and second coordinate systems by tying-in the relative locations of the reference points, such that the reference points coincide in three dimensional space. Tying-in additional reference points of additional tie-in devices provides proper orientation of the two coordinate systems and improved accuracy of the tying-in procedure. The processing circuitry that correlates the two coordinate systems may also be linked or in communication with the control systems of the positioning system 10 to control one or more actuating devices 16 in response to measurements provided by the locating devices 32 and 34 such that a position of a component measured in a first coordinate system can be positioned by the actuating devices relative to a predefined position measured in the second coordinate system.

After the processing circuitry or other computing device has correlated the first and second coordinate systems, the processing circuitry or other computing device is advantageously capable of moving, or directing the movement of, one or more components, such as the wing component 14 of FIG. 1, relative to other components based upon the measurements made by the first locating device and/or the second locating device. For the embodiment of FIG. 1, the first locating device 32 maps the surface of the wing component 14 to determine the position and orientation of the wing component. The second locating device 34 in FIG. 1 locates the fuselage 12 based upon at least one component target 50 mounted on the fuselage that are advantageously positioned at a predefined distance from the predefined position that the wing component is to be positioned. The second locating device 34 also locates the reference point of the tie-in devices 30, which are at known locations relative to the wing component 14 in the first coordinate system. The processing circuitry advantageously controls the actuating devices 16 to move the wing component 14 to the fuselage 12 based upon the measurements made by the second locating device 34 and adjust the orientation of the wing component based upon the measurements made by the first locating device 32. The processing circuitry may thus control the actuating devices until the components have been fully engaged to ensure the wing component 14 is properly assembled and is optimally oriented based upon the design objectives of the assembled structure. Accordingly, the tie-in devices of the present invention provide improved assembly procedures by correlating the measurements from two or more locating devices that may provide discrete measurements during the assembly procedure, The first locating device 32 of the positioning system 10 of FIG. 1 is a laser radar measurement device. The laser radar measurement device of the embodiment of the present invention illustrated in FIG. 1 is the Leica LR200 available from Leica Geosystems of Heerbrugg, Switzerland. The Leica LR200 is a 3D non-contact measurement device that combines radar, laser, and 3D software technologies to provide measurements of components. The laser radar measurement system scans surfaces to define the contours, dimensions, locations, or the like of the surfaces scanned and does not require additional devices such as photogrammetry dots, reflectors, probes, or the like. The rectangular dashed lines projecting from the first locating device 32 shown in FIG. 1 represent an area that is mapped by the laser radar measurement device, such that the mapped area includes the wing component 14 and at least one of the tie-in devices 30. Therefore, the first locating device 32 is capable of determining the orientation of the wing component 14, which is important to control during the assembly procedure because the orientation of the wing of the assembled aircraft affects the aerodynamic performance of the aircraft. The first locating device 32 is also capable of locating the wing component 14 relative to the reference points of the tie-in devices 30, so that the position and orientation of the wing component may be correlated to the measurements made by the second locating device of the fuselage 12 relative to the tie-in devices 30. Specifically, the position and orientation of the wing component 14 measured by the first locating device 32 is correlated to the position, orientation, or the like of the fuselage 12 measured by the second locating device 34, which locates the component targets 50 proximate the fuselage, such that the wing component is moved by the actuating device to a predefined position relative to the fuselage 12 based upon the position of the fuselage in the second coordinate system.

The second locating device 34 of the positioning system 10 of FIG. 1 is a laser interferometer measurement device. The laser interferometer measurement device of the embodiment of the present invention illustrated in FIG. 1 is the Leica 3D Laser Tracker LTD500, which is also available from Leica Geosystems of Heerbrugg, Switzerland. The 3D Laser Tracker LTD500 is a measurement device that provides a 3D location for a reflector, such as the laser interferometer reflector 48 of the target 42 of the tie-in device 30. The laser interferometer measurement device scans an area with a laser interferometer signal and receives a return laser interferometer signal that is reflected back to the laser interferometer measurement device by the reflector 48 so that the laser interferometer measurement device locates the reflector. By determining the location of one or more targets 42 on the tie-in device 30, the laser interferometer measurement device, advantageously with processing circuitry, determines the location of the reference point of the tie-in device in the second coordinate system.

The second locating device 34 of the positioning system 10 of FIG. 1 is also able to determine the location of additional reflectors, such as the reflectors on the component target 50 on the fuselage 12. As shown in FIG. 1, three component targets 50 are provided on the fuselage 12 proximate the area of the fuselage where the wing component 14 will be joined during assembly. Further embodiments of the present invention may comprise any number of component targets located at any position relative to the area of the fuselage to which the wing component will be joined, which is the predefined position for the illustrated embodiment. The locations of each component target 50 relative to the area of the fuselage 14 where the wing component 12 will be joined are advantageously predetermined distances and directions in 3D space that are known by the positioning system 10 prior to assembly of the structure. The arrows projecting to and from the second locating device 34 represent the scanned laser interferometer signals that are transmitted and the reflected laser interferometer signals that are received by the laser interferometer measurement device.

Further embodiments of the present invention may comprise alternative or additional locating devices. One non-limiting example of an alternative or additional locating device is an infrared measurement device. The infrared measurement device of one embodiment of the present invention comprises the Constellation3Di™ indoor GPS system available from Arc Second of Dulles, Va. The infrared measurement device comprises a plurality of transmitters located a sufficient distance from the components being assembled such that the infrared signals transmitted by the infrared measurement device are in communication with and are received by at least one infrared detector on the tie-in devices and the components being assembled. The infrared detectors, which are also comprised by the infrared measurement device, receive the transmitted infrared signals. The infrared detectors, which may be comprised of flat detectors, cylindrical detectors, vector bar detectors, or the like as described below, generate a signal that is advantageously sent to processing circuitry or a computing device similar to the signals from the alternative locating devices described above, such that the location of each detector is determined so that the location of the detector and possibly the reference point of the tie-in device are determined. The signals from the infrared detectors are advantageously sent to the processing circuitry or computing device through a physical electrical connection, however, further embodiments of the present invention may send the signals from the infrared detectors by wireless communication, such as RF communication to list one non-limiting example. Still further embodiments of the positioning system of the present invention comprise alternative locating devices.

FIG. 3 illustrates a tie-in device 60 of a second embodiment of the present invention, wherein the tie-in device comprises a generally spherical outer surface 62 and at least one target 64 further comprising an infrared flat detector for use with an infrared measurement device as described above. A non-limiting example of an infrared flat detector is the Constellation 3Di™ PATCH DETECTOR, which is also available from Arc Second of Dulles, Va. The tie-in device 60 also comprises a base 66 on the bottom of the generally spherical outer surface 62 to mount the tie-in device to a sufficient surface such that the tie-in device is in a fixed location relative to a component during assembly, as described above.

The tie-in device 60 of FIG. 3 is advantageously used with a first locating device 32 comprising a laser radar measurement device to map the outer surface 62 of the tie-in device to locate the reference point of the tie-in device in the first coordinate system as described above and with a second locating device comprising an infrared measurement device with infrared flat detectors that receive a plurality of infrared signals transmitted by a plurality of transmitters of the infrared measurement device to locate the infrared flat detectors on the tie-in device. By determining the location of the infrared flat detectors, which are located at a second predefined distance from the reference point, on the surface of the tie-in device 60, the location of the reference point is determined in the second coordinate system, advantageously by sending the signals created by the infrared flat detectors to processing circuitry that determines the location of the reference point in the second coordinate system. It should be noted that the second predefined distance from the target, such as a reflector or detector, for each embodiment of the positioning system 10 may define a predefined distance that is unique to that embodiment. The relative locations of the reference point in the first and second coordinate systems are correlated to define the position of the component, which is located by the first locating device in the first coordinate system as described above, and in the second coordinate system. Additional infrared flat detectors are advantageously located in the second coordinate system as component targets to locate one or more components for assembly with the component mapped by the first locating device. Additional correlations of coordinate systems by the tie-in device 60 of FIG. 3 are advantageously defined in further embodiments of the positioning system of the present invention.

FIG. 4 illustrates a tie-in device 70 of a third embodiment of the present invention, wherein the tie-in device comprises a generally spherical outer surface 72 and at least one target 74 further comprising an infrared cylindrical detector for use with an infrared measurement device as described above. A non-limiting example of an infrared cylindrical detector is the Constellation 3Diυ One Detector Tool, 32 Facet Cylindrical Detector End 1, which is also available from Arc Second of Dulles, Va. The tie-in device 70 also comprises a base 76 on the bottom of the generally spherical outer surface 72 to mount the tie-in device, as described above.

The tie-in device 70 of FIG. 4 is advantageously used with a first locating device 32 comprising a laser radar measurement device to map the outer surface 72 of the tie-in device to locate the reference point of the tie-in device in the first coordinate system as described above and with a second locating device comprising an infrared measurement device with infrared cylindrical detectors that receive a plurality of infrared signals transmitted by a plurality of transmitters of the infrared measurement device to locate the infrared cylindrical detectors on the tie-in device. By determining the location of the infrared cylindrical detectors, which are located at a second predefined distance from the reference point, on the surface of the tie-in device 70, the location of the reference point is determined in the second coordinate system, advantageously by sending the signals created by the infrared cylindrical detectors to processing circuitry that determines the location of the reference point in the second coordinate system. The relative locations of the reference point in the first and second coordinate systems are correlated to define the position of the component, which is located by the first locating device in the first coordinate system as described above, and in the second coordinate system. Additional infrared cylindrical detectors are advantageously located in the second coordinate system as component targets to locate one or more components for assembly with the component mapped by the first locating device. Additional correlations of coordinate systems by the tie-in device 70 of FIG. 4 are advantageously defined in further embodiments of the positioning system of the present invention.

FIG. 5 illustrates a tie-in device 80 of a fourth embodiment of the present invention, wherein the tie-in device comprises a generally spherical outer surface 82 and at least one target 84 further comprising an infrared vector bar detector for use with an infrared measurement device as described above. A non-limiting example of an infrared vector bar detector is the Constellation 3Di™ Two Detector Tool, 32 Facet Cylindrical Detector End 2, which is also available from Arc Second of Dulles, Va. The tie-in device 80 also comprises a base 86 on the bottom of the generally spherical outer surface 82 to mount the tie-in device, as described above.

The tie-in device 80 of FIG. 5 is advantageously used with a first locating device 32 comprising a laser radar measurement device to map the outer surface 82 of the tie-in device to locate the reference point of the tie-in device in the first coordinate system as described above and with a second locating device comprising an infrared measurement device with an infrared vector bar detector that receives a plurality of infrared signals transmitted by a plurality of transmitters of the infrared measurement device to locate the infrared vector bar detector on the tie-in device. By determining the location of the infrared vector bar detector, which are located at a second predefined distance from the reference point, on the surface of the tie-in device 80, the location of the reference point is determined in the second coordinate system, advantageously by sending the signals created by the infrared cylindrical detectors to processing circuitry that determines the location of the reference point in the second coordinate system. The illustrated embodiment having only one infrared vector bar detector 84 is sufficient to accurately determine the reference point of the tie-in device 80 in the second coordinate system because the determined locations of the two cylindrical detectors of the vector bar detector enable the processing circuitry or other computing device to determine the location of the reference point relative to the two cylindrical detectors of the vector bar detector. The relative locations of the reference point in the first and second coordinate systems are correlated to define the position of the component, which is located by the first locating device in the first coordinate system as described above, and in the second coordinate system. Additional infrared cylindrical detectors or infrared vector bar detectors are advantageously located in the second coordinate system as component targets to locate one or more components for assembly with the component mapped by the first locating device. Additional correlations of coordinate systems by the tie-in device 80 of FIG. 5 are advantageously defined in further embodiments of the positioning system of the present invention.

FIG. 6 illustrates a tie-in device 90 of a fifth embodiment of the present invention, wherein the tie-in device comprises a generally spherical outer surface 92 and two unique targets 94 and 96 for use with a second locating device and a third locating device, respectively. The target that is located by the second locating device is an infrared vector bar detector 94 similar to the infrared bar vector 84 of FIG. 5 for use with an infrared measurement device as described above. The target of FIG. 6 that is located by the third locating device is a laser interferometer reflector 96 similar to the laser interferometer reflector 48 of FIG. 2 for use with a laser interferometer measurement device as described above. The tie-in device 90 of FIG. 6 also comprises a base 86 on the bottom of the generally spherical outer surface 92 to mount the tie-in device, as described above.

The tie-in device 90 of FIG. 6 is advantageously used with a first locating device 32 comprising a laser radar measurement device to map the outer surface 92 of the tie-in device to locate the reference point of the tie-in device in the first coordinate system as described above. The tie in device 90 is also used with a second locating device comprising an infrared measurement device to receive a plurality of infrared signals transmitted by a plurality of transmitters of the infrared measurement device to locate the infrared vector bar detector on the tie-in device. In addition, the tie-in device 90 is used with a third locating device comprising a laser interferometer measurement device to scan and receive a laser interferometer signal reflected by the laser interferometer reflector 96 that is received by the laser interferometer measurement device to locate the reflector. By determining the location of the infrared vector bar detector, which is located at a second predefined distance from the reference point, on the surface of the tie-in device 90, the location of the reference point is determined in the second coordinate system, advantageously by sending the signals created by the infrared cylindrical detectors to processing circuitry that determines the location of the reference point in the second coordinate system. Likewise, by determining the location of at least one laser interferometer reflector 96, which is located at a third predefined distance from the reference point, on the surface of the tie-in device 90, the location of the reference point is determined in the third coordinate system, advantageously by sending the signals created by the laser interferometer measurement device to processing circuitry that determines the location of the reference point in the third coordinate system.

The relative locations of the reference point in the first, second, and third coordinate systems are correlated to define the position of the component, which is located by the first locating device in the first coordinate system as described above, in the second coordinate system, and in the third coordinate system. Additional infrared cylindrical detectors are advantageously located in the second coordinate system as component targets to locate one or more components for assembly with the component mapped by the first locating device. Likewise, additional laser interferometer reflectors are advantageously located in the third coordinate system, also as component targets, to locate one or more components for assembly with the component mapped by the first locating device. Additional correlations of coordinate systems by the tie-in device 90 of FIG. 6 are advantageously defined in further embodiments of the positioning system of the present invention.

The present invention also comprises methods for defining the position of a component as well as positioning a component to a predefined position. To define the position of a component, at least one tie-in device 30 is mounted in a fixed position relative to the component, and a location of a reference point of each tie-in device is determined by transmitting a first signal, such as the laser radar signal discussed in FIG. 1, that is in communication with the outer surface 40 of the tie-in device. The outer surface 40 has a predefined geometric shape, such as generally spherical, that is located at a first predefined distance from the reference point, such as the center of the generally spherical outer surface. By determining the position of the outer surface 40 of the tie-in device 30, the location of the reference point is determined. The first signal also maps the surface of the component to determine the position of the component relative to the reference point in the first coordinate system.

To define the position of the component in the second coordinate system, the location of the reference point of the tie-in device 30 is also determined by transmitting a signal, such as a laser interferometer signal or infrared signal, that is different than the first signal and that is in communication with at least one target on the outer surface of the tie-in device 30 that is located a second predefined distance from the reference point. Therefore the location of the reference point is determined in the second coordinate system, as described above. Tying-in the relative locations of the reference point in the first and second coordinate systems, to correlate the first and second coordinate systems, defines the position of the component in the second coordinate system. A similar method is used to define the position of the component in the third coordinate system.

If the component measured by the first locating device is placed upon an actuating device, and if the predefined position to which the component should be positioned in order to properly and/or optimally assemble that component to another component is located in the second coordinate system, the component on the actuating device can be moved to the predefined position by correlating the relative locations of the at least one tie-in device as the component is moved. Accordingly, the component is movable based on real-time data provided by two or more locating devices that are capable of independently measuring the various components of the assembly. Therefore, the positioning system of the present invention provides quick and accurate positioning of components and assemblies. These and further methods of defining the position of a component and further positioning the component based upon measurements made in two or more coordinate systems are provided by the positioning system of the present invention.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A tie-in device for correlating at least two different coordinate systems, the tie-in device comprising:
   an outer surface having a predefined geometric shape located at a first predefined distance from a reference point of the tie-in device, wherein the outer surface is mappable to determine a location of the reference point in a first coordinate system; and
   at least one target located at a second predefined distance from the reference point, wherein the target is locatable in a second coordinate system, which is different than the first coordinate system, to determine a location of the reference point in a second coordinate system, wherein the relative locations of the reference point are tied-in to correlate the first and second coordinate systems.

2. A tie-in device according to claim 1 wherein the outer surface of the tie-in device comprises a generally spherical surface, such that a center of the generally spherical surface defines the reference point.

3. A tie-in device according to claim 1 wherein the target is joined to the outer surface of the tie-in device.

4. A tie-in device according to claim 1 wherein the target comprises an infrared cylindrical detector protruding from the outer surface of the tie-in device.

5. A tie-in device according to claim 4 wherein the target defines an infrared vector bar detector comprising two cylindrical detectors.

6. A tie-in device according to claim 1 wherein the target comprises an infrared flat detector joined to the outer surface of the tie-in device.

7. A tie-in device according to claim 1 wherein the target comprises a laser interferometer reflector.

8. A positioning system for moving a component to a predefined position, the positioning system comprising:
   at least one tie-in device mounted in a fixed position relative to the component, the tie-in device comprising:
      an outer surface having a predefined geometric shape located at a first predefined distance from a reference point of the tie-in device; and
      at least one target located at a second predefined distance from the reference point;
   a first locating device that maps the outer surface of the tie-in device to determine a location of the reference point in a first coordinate system, wherein the first locating device maps a surface of the component in the first coordinate system to determine a position of the component relative to the reference point of the tie-in device;
   a second locating device that transmits a signal that is in communication with the target to locate the target and determine a location of the reference point in a second coordinate system, which is different than the first coordinate system, wherein the relative locations of the reference point determined by the first and second locating devices are tied-in to correlate the first and second coordinate systems and thereby define the position of the component in the second coordinate system; and
   an actuating device that moves the component to the predefined position based upon the position of the component in the second coordinate system.

9. A positioning system according to claim 8 wherein the outer surface of the tie-in device comprises a generally spherical surface, such that a center of the generally spherical surface defines the reference point.

10. A positioning system according to claim 8 wherein the target is joined to the outer surface of the tie-in device.

11. A positioning system according to claim 8 wherein the second locating device locates the predefined position prior to moving the component to the predefined position.

12. A positioning system according to claim 8 wherein the first locating device comprises a laser radar measurement device.

13. A positioning system according to claim 8 wherein the second locating device comprises an infrared measurement device.

14. A positioning system according to claim 13 wherein the target comprises an infrared cylindrical detector protruding from the generally spherical surface of the sphere.

15. A positioning system according to claim 13 wherein the target comprises an infrared flat detector joined to the generally spherical surface of the sphere.

16. A positioning system according to claim 8 wherein the second locating device comprises a laser interferometer measurement device.

17. A positioning system according to claim 16 wherein the target comprises a laser interferometer reflector.

18. A positioning system according to claim 6 wherein the actuating device comprises at least one servomotor.

19. A method of defining a position of a component, comprising the steps of:

determining a location of at least one reference point of a tie-in device in a first coordinate system by transmitting a first signal that is in communication with an outer surface of the tie-in device having a predefined geometric shape located at a first predefined distance from the reference point, wherein the first signal maps a surface of the component in the first coordinate system to determine the position of the component relative to the reference point in the first coordinate system;

determining a location of the reference point of the tie-in device in a second coordinate system, which is different than the first coordinate system, by transmitting a second signal, which is different than the first signal, that is in communication with at least one target located at a second predefined distance from the reference point to determine the location of the reference point in the second coordinate system; and correlating the first and second coordinate systems by tying-in the relative locations of the reference point to define the position of the component in the second coordinate system.

20. A method according to claim 19 wherein determining a location of the reference point in a first coordinate system comprises transmitting a laser radar signal.

21. A method according to claim 20 wherein determining a location of the reference point in a second coordinate system comprises transmitting an infrared signal.

22. A method according to claim 20 wherein determining a location of the reference point in a second coordinate system comprises transmitting a laser interferometer signal.

23. A method according to claim 20 wherein determining a location of the reference point in a first coordinate system comprises mapping a generally spherical surface of the tie-in device to locate the reference point.

24. A method according to claim 19, further comprising the steps of:

determining a location of the reference point of the tie-in device in a third coordinate system, which is different than the first and second coordinate systems, by transmitting a third signal, which is different than the first and second signals, that is in communication with at least one target located at a third predefined distance from the reference point to determine the location of the reference point in the third coordinate system; and correlating the first and third coordinate systems by tying-in the relative locations of the reference point to define the position of the component in the third coordinate system.

25. A method of positioning a component to a predefined position, comprising the steps of:

placing the component on an actuating device comprising at least one tie-in device;

determining a location of at least one reference point of the tie-in device in a first coordinate system by transmitting a first signal that is in communication with an outer surface of the tie-in device having a predefined geometric shape located at a first predefined distance from the reference point, wherein the first signal maps a surface of the component in the first coordinate system to determine the position of the component relative to the reference point in the first coordinate system;

determining a location of the reference point of the tie-in device in a second coordinate system, which is different than the first coordinate system, by transmitting a second signal, which is different than the first signal, that is in communication with at least one target located at a second predefined distance from the reference point to determine the location of the reference point in the second coordinate system; and correlating the first and second coordinate systems by tying-in the relative locations of the reference point to define the position of the component in the second coordinate system; and moving the component to the predefined position based upon the position of the component in the second coordinate system.

26. A method according to claim 25, further comprising the step of determining a location of the predefined position in the second coordinate system by transmitting the second signal that is in communication with the predefined position, prior to moving the component to the predefined position.

27. A method according to claim 25 wherein determining a location of the reference point in the first coordinate system comprises transmitting a laser radar signal.

28. A method according to claim 27 wherein determining a location of the reference point in the second coordinate system comprises transmitting an infrared signal.

29. A method according to claim 27 wherein determining a location of the reference point in the second coordinate system comprises transmitting a laser interferometer signal.

30. A method according to claim 25 wherein determining a location of the reference point in the first coordinate system comprises mapping a generally spherical surface of the tie-in device to locate the reference point.

* * * * *